(12) United States Patent
Sparks et al.

(10) Patent No.: US 9,476,775 B2
(45) Date of Patent: Oct. 25, 2016

(54) EXHAUST GAS TEMPERATURE SENSOR INCLUDING STRAIN RELIEF AND/OR ANTI-VIBRATION SLEEVE

(75) Inventors: Robert J. Sparks, Bellville, OH (US); Douglas I. Obenour, Bellville, OH (US); Ronald N. Landis, Bellville, OH (US)

(73) Assignee: STONERIDGE, INC., Warren, OH (US)

(*) Notice: Subject to any disclaimer, the term of this patent is extended or adjusted under 35 U.S.C. 154(b) by 855 days.

(21) Appl. No.: 13/019,202

(22) Filed: Feb. 1, 2011

(65) Prior Publication Data

US 2011/0238281 A1  Sep. 29, 2011

Related U.S. Application Data

(60) Provisional application No. 61/300,391, filed on Feb. 1, 2010.

(51) Int. Cl.
  *G01K 1/08*  (2006.01)
  *G01K 1/14*  (2006.01)
  (Continued)

(52) U.S. Cl.
  CPC ............. *G01K 1/12* (2013.01); *G01K 2205/04* (2013.01)

(58) Field of Classification Search
  CPC ............ G01K 7/00; G01K 1/08; G01K 1/14; G01K 7/02; H01C 3/04; H01C 37/02; H05K 5/00; H05K 13/00
  USPC ......... 374/163, 141, 144, 185, 179, 208, 57, 374/45, 4, 147, 148; 73/866.5
  See application file for complete search history.

(56) References Cited

U.S. PATENT DOCUMENTS 2,820,840 A * 1/1958 Anderson et al. ............ 136/231
2,866,058 A * 12/1958 Hebenstreit .............. G01K 1/14
                                                  174/84 R
(Continued)

FOREIGN PATENT DOCUMENTS

CN   101454651 A   6/2009
WO   2011-094753  8/2011

OTHER PUBLICATIONS

International Search Report and Written Opinion mailed Nov. 2, 2012 in connection with corresponding PCT Patent Application No. PCT/US12/51982.

(Continued)

*Primary Examiner* — Gail Kaplan Verbitsky
(74) *Attorney, Agent, or Firm* — Grossman, Tucker, Perreault & Pfleger, PLLC

(57) ABSTRACT

A temperature sensor includes a housing and a temperature sensing element disposed in the housing. Electrical connections may extend from the temperature sensing element through the housing and an epoxy may be disposed in the housing, wherein the epoxy may at least partially around the temperature sensing element. The epoxy may provide a thermal pathway between the sensing element and the housing and may be being flexible to accommodate different rates of thermal expansion between the temperature sensing element and the electrical connections without requiring a separate mechanical strain relief. A temperature sensor system includes a temperature sensor and a mineral insulated cable coupled to the temperature sensor. The temperature sensor may be configured to be removably coupled to the mineral insulated cable via a stop flange and a sleeve coupled to the mineral insulated cable. The sleeve may be configured to provide stability and reduce vibrational stress to the temperature sensor system.

20 Claims, 6 Drawing Sheets

(51) Int. Cl.
*G01K 7/02* (2006.01)
*G01K 7/00* (2006.01)
*G01K 1/12* (2006.01)

(56) References Cited

U.S. PATENT DOCUMENTS

| | | | | |
|---|---|---|---|---|
| 2,981,109 | A * | 4/1961 | Knudsen | G01K 1/08 338/28 |
| 3,741,816 | A * | 6/1973 | Wagner | 136/228 |
| 3,783,309 | A * | 1/1974 | Alibert | G01K 1/024 310/319 |
| 4,001,045 | A * | 1/1977 | Smith | G01K 1/14 136/230 |
| 4,102,196 | A * | 7/1978 | Holtermann | 136/214 |
| 4,304,126 | A * | 12/1981 | Yelke | 73/114.51 |
| 4,323,727 | A | 4/1982 | Berg | |
| 4,361,036 | A * | 11/1982 | Levenson | 73/114.72 |
| 4,499,330 | A * | 2/1985 | Pustell | 136/230 |
| 4,525,081 | A * | 6/1985 | Myhre | F16F 7/10 267/141.2 |
| 4,672,845 | A * | 6/1987 | Hirsch et al. | 73/152.01 |
| 4,733,019 | A | 3/1988 | Pichler et al. | |
| 4,934,831 | A * | 6/1990 | Volbrecht | 374/183 |
| 5,396,966 | A * | 3/1995 | Roos et al. | 175/45 |
| 5,749,656 | A * | 5/1998 | Boehm et al. | 374/185 |
| 5,823,680 | A * | 10/1998 | Kato et al. | 374/185 |
| 6,334,707 | B1 * | 1/2002 | Ku | 374/208 |
| 6,338,571 | B1 * | 1/2002 | Chen | 374/208 |
| 6,367,974 | B1 * | 4/2002 | Lin | 374/179 |
| 6,501,366 | B2 * | 12/2002 | Takahashi et al. | 338/25 |
| 6,679,627 | B1 * | 1/2004 | Allaire | 374/156 |
| 7,021,824 | B2 * | 4/2006 | Wawro et al. | 374/208 |
| 7,104,685 | B2 | 9/2006 | Hanzawa et al. | |
| 7,360,947 | B2 | 4/2008 | Krishnamurthy et al. | |
| 7,465,086 | B1 * | 12/2008 | Foreman, Jr. | 374/143 |
| 7,931,401 | B2 | 4/2011 | Landis et al. | |
| 2002/0084884 | A1 | 7/2002 | Takahashi et al. | |
| 2004/0101028 | A1 * | 5/2004 | Iwaya et al. | 374/163 |
| 2004/0134282 | A1 * | 7/2004 | Hayashi et al. | 73/708 |
| 2004/0134559 | A1 * | 7/2004 | Huang | 140/123 |
| 2004/0218662 | A1 | 11/2004 | Hanzawa et al. | |
| 2005/0193838 | A1 | 9/2005 | Valles | |
| 2005/0265426 | A1 | 12/2005 | Hanzawa | |
| 2006/0176931 | A1 * | 8/2006 | Miyahara et al. | 374/208 |
| 2008/0031306 | A1 * | 2/2008 | Yamada | G01K 1/08 374/208 |
| 2008/0149208 | A1 * | 6/2008 | Kurara et al. | 138/106 |
| 2008/0205484 | A1 | 8/2008 | Toudou et al. | |
| 2009/0151859 | A1 | 6/2009 | Landis et al. | |
| 2010/0054301 | A1 * | 3/2010 | Abe | G01K 1/08 374/148 |
| 2010/0195698 | A1 * | 8/2010 | Hori | 374/148 |
| 2013/0064266 | A1 | 3/2013 | Mori | |
| 2014/0064926 | A1 * | 3/2014 | Warren | 415/118 |

OTHER PUBLICATIONS

International Search Report and Written Opinion dated Oct. 28, 2011 issued in related International Patent Application No. PCT/US2011/023390.

Office Action mailed May 29, 2014 in corresponding U.S. Appl. No. 13/592,448.

European Communication and Search Report dated Apr. 20, 2015 in corresponding European Patent Application No. 12825293.9.

Chinese Official Action dated May 28, 2015 in corresponding Chinese Patent Application No. 201280040707.4.

Office Action issued Jul. 25, 2016 in corresponding Japanese Patent Application No. 2014-527284.

* cited by examiner

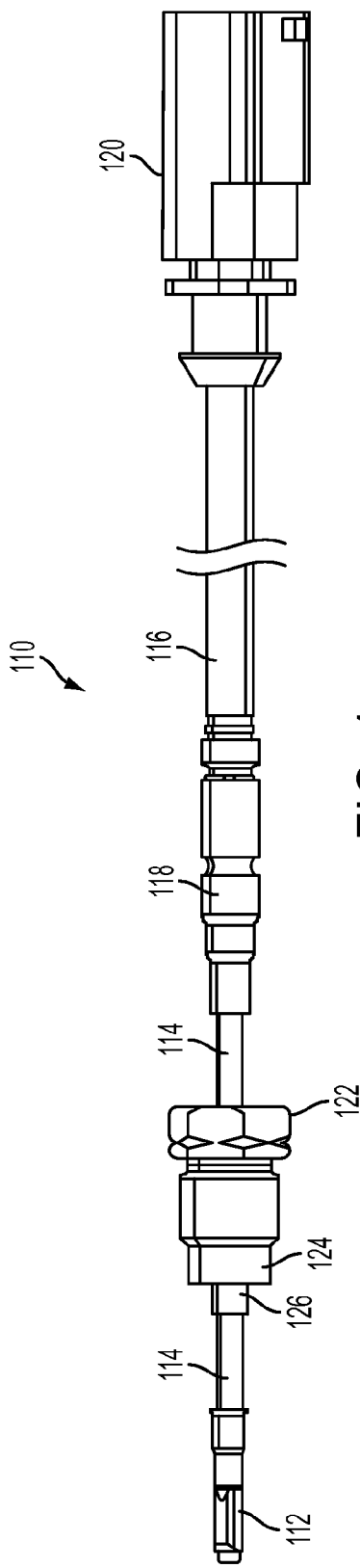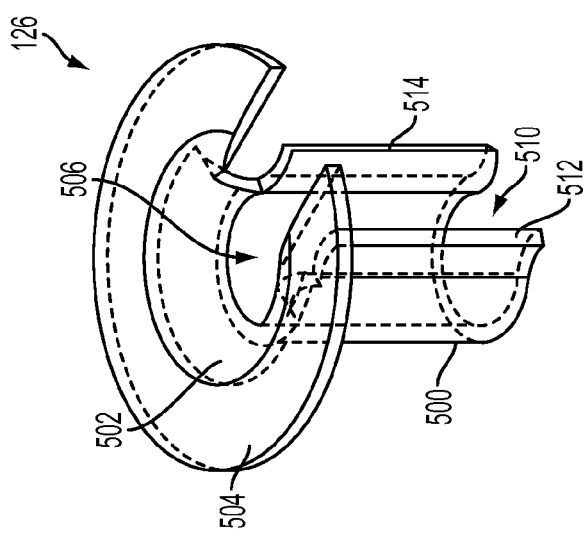

EXHAUST GAS TEMPERATURE SENSOR INCLUDING STRAIN RELIEF AND/OR ANTI-VIBRATION SLEEVE

CROSS REFERENCE TO RELATED APPLICATIONS

The present application claims the benefit of U.S. Provisional Patent Application Ser. No. 61/300,391, filed Feb. 1, 2010, the entire disclosure of which is incorporated herein by reference.

TECHNICAL FIELD

The present disclosure relates generally to temperature sensors for internal combustion engines. More specifically, the present disclosure may relate to an exhaust gas temperature sensor including an epoxy in the sensor tip for providing strain relief and heat transfer and also a sensor including an anti-vibration sleeve.

BACKGROUND

Internal combustion engines such as, but not limited to, diesel and gasoline engines, may include one or more temperature sensors at least partially disposed within the exhaust gas system. These temperature sensors may sense the temperature of the exhaust gas and may be used, at least in part, by an engine control system to adjust one or more properties of the engine such as, but not limited to, air/fuel ratio, boost pressure, timing or the like. Because of the operating environment, the temperature sensors may be exposed to relatively harsh conditions including, but not limited to, vibration, exposure to debris, moisture and corrosive chemicals, large temperature ranges and relatively high continuous use operating temperatures. The conditions may degrade the performance of the temperature sensors and may, ultimately, render the temperature sensors unsuitable for their intended purpose.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

FIG. 4 is a side view of a temperature sensor system consistent with the present disclosure;

FIG. 5 is a perspective view of one embodiment of an anti-vibration sleeve consistent with the present disclosure;

DETAILED DESCRIPTION

The present disclosure is generally directed at temperature sensors. Embodiments described herein may relate to an exhaust gas temperature sensor system, for example, an exhaust gas temperature sensor system configured to be used with an internal combustion engine such as, but not limited to, a diesel engine, a gasoline engine, or the like. The output of the exhaust gas temperature sensor system may be received by a controller to control one or more parameters of the engine. However, a sensor and/or system consistent with the present disclosure may be used to detect, sense and/or monitor the temperature of other parameters including, but not limited to, catalytic converter temperature, lubricant temperature (such as, but not limited to, engine oil, transmission oil, differential oil, or the like), brake temperature, engine coolant temperature, or the like. A sensor and/or system consistent with the present disclosure may be employed in connection with various other applications, both related to, and unrelated to, vehicles.

Figure 1:
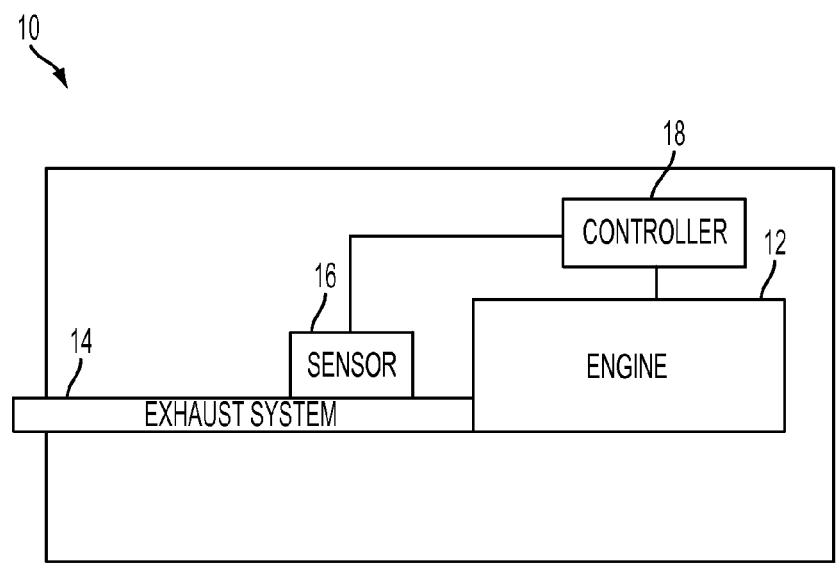
FIG. 1 is a schematic illustration of a vehicle including a temperature sensor consistent with the present invention.

Referring to FIG. 1 an embodiment of a vehicle 10 is schematically depicted. The vehicle 10 may include an internal combustion engine 12 having an exhaust system 14 which may carry a flow of exhaust gasses from the engine 12. A temperature sensor 16 may be coupled to the exhaust system 14 for measuring a temperature of the exhaust gasses carried by the exhaust system 14. The temperature sensor 16 may provide an output responsive to, or indicative of, a temperature of the exhaust gasses. A vehicle control system 18, such as an engine control module (ECM), etc., may receive the output from the temperature sensor 16. The engine control system 18 may vary one or more operating parameters, such as fuel delivery, air/fuel ratio, boost pressure, timing or the like in response to the output of the temperature sensor 16.

Figure 2:
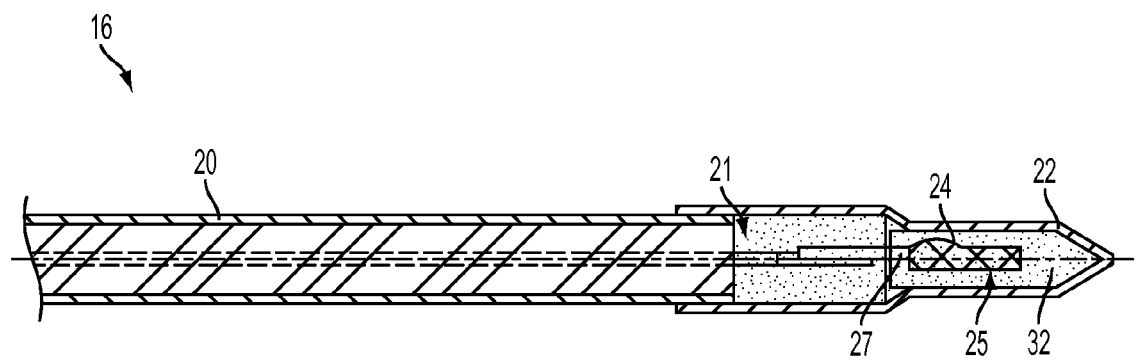
FIG. 2 is a side cross-sectional view of an embodiment of a temperature sensor consistent with the present invention.
Figure 3:
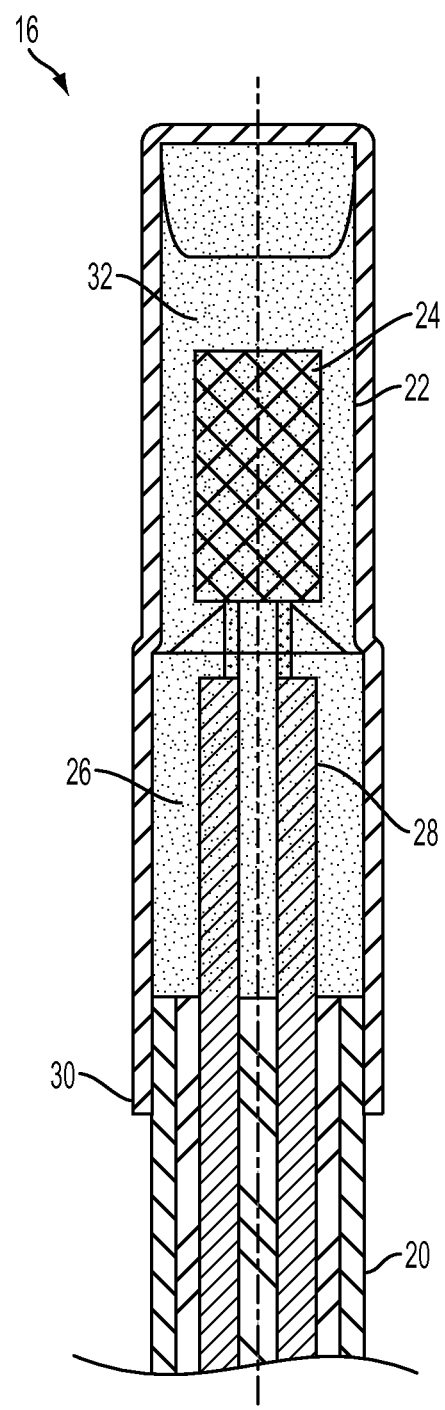
FIG. 3 is a front cross-sectional view of the temperature sensor shown in FIG. 2.

Turning to FIGS. 2 and 3, a portion of an embodiment of a temperature sensor 16 consistent with the present invention is shown in side and front cross-sectional views. The temperature sensor 16 may generally include a longitudinal body 20 having a housing 22 disposed at one end of the body 20. A temperature sensing element 24 may be disposed at least partially within the housing 22. Electrical connections 26, 28 for the temperature sensor 16 may extend from the temperature sensing element 24 and through the body 20. The temperature sensor system may include various mounting features, such as a flange and mounting nut, a compression ferrule, etc., capable of mounting the temperature sensor extending at least partially into an exhaust system while maintaining a generally sealed condition of the exhaust system. Similarly, the temperature sensor system may include electrical connectors or contacts electrically coupled to the electrical connections for the temperature sensor. Suitable connectors may include integral features as well as pigtail connectors, etc.

The temperature sensing element 24 may be a resistive temperature sensing element, in which the electrical resistance through the element may vary as a function of temperature. In a particular embodiment, the temperature sensing element 24 may be a thin film resistive temperature detector including at least one metal film 25, e.g. a platinum film, film disposed on a substrate 27. Various temperature sensing elements may also be used in connection with the present invention, such as thermocouples, etc.

As shown, the housing 22 may define an interior volume 21. The temperature sensing element 24 may be at least partially disposed within the interior volume defined by the housing 22. As such, the temperature sensing element 24 may be at least partially encapsulated by the housing 22. The housing 22 may be coupled to the body 20 of the temperature sensor 16 at an open end 30 of the housing 22. In one embodiment, the housing 22 may be coupled to the body 20 to provide a generally gas tight seal, thereby placing the temperature sensing element 24 in a generally closed environment. The generally closed environment may reduce or eliminate exposure of the temperature sensing element 24 to contaminants, etc., of the exterior environment.

Consistent with the present disclosure, an epoxy 32 may be disposed within the housing 22, and may at least partially surround the temperature sensing element 24. In one embodiment, the epoxy may fill the entire space between the sensing element 24 and the interior surface of the housing 22. The epoxy 32 may be provided through the open end of the housing in a liquid form and then cured in the housing, e.g. thermally. In general, the epoxy may provide thermal conductivity while being flexible to accommodate for thermally induced stresses in or between the sensor elements, e.g. between the sensing element 24 and leads connected thereto, during operation. A variety of materials may suitably be employed as the epoxy 32 in connection with the present disclosure.

The epoxy 32 has a greater thermal conductivity than air or a gaseous medium. The epoxy 32 may thus, at least to some extent, overcome any insulating effect of the separation between the housing 22 and the temperature sensing element 24. The epoxy 32 may provide a thermal pathway between the housing 22 and the temperature sensing element 24, and may, thereby, increase the thermal response of the temperature sensor 16.

In addition, use of the epoxy 32 may eliminate the need for a separate mechanical strain relief to accommodate for thermally induced stresses on the sensor elements. Instead of the separate strain relief, the epoxy may be resiliently flexible/expandable to allow the sensor components, e.g. the sensing element and the leads coupled thereto, to expand at different rates, e.g. due different coefficients of thermal expansion. This alleviates thermally induced stresses in the sensor, without requiring a separate mechanical strain relief.

Referring now to FIG. 4, there is illustrated a temperature sensor system 110 consistent with at least one embodiment herein. The exhaust gas temperature sensor system 110 may comprise a temperature sensor 112, such as the sensor 16 described above, coupled to one end of a cable 114 including one or more electrical conductors, such as a mineral insulated (MI) cable, a wire harness assembly 116, and a coupler 118 configured to couple the cable 114 to the wire harness assembly 116. The wire harness assembly 116 may optionally include a connector 120 configured to electrically and/or mechanically couple the exhaust gas temperature sensor system 110 to a wiring harness or the like, and ultimately to at least a portion and/or subsystem of the ECM.

The temperature sensor 112 may be configured to output a signal representative of the temperature of the exhaust gas, for example, the exhaust gas flowing through at least a portion of the exhaust gas system. The temperature sensor 112 may be selected depending on the intended operating temperature range, accuracy and/or precision desired. According to at least one embodiment consistent herein, the temperature sensor 112 may include a resistive temperature detector (RTD).

The temperature sensor 112 may be configured to be removably securable. For example, exhaust gas temperature sensor system 110 may include a nut 122 and optionally a stop flange 124. The nut 122 may be internally or externally threaded and may be configured to be threaded within an aperture of the exhaust gas system (such as, but not limited to, the exhaust manifold, down pipe, or the like) until the stop flange 124 engages the exhaust system (for example, a shoulder on the exhaust system).

According to one embodiment consistent with the present disclosure, the cable 114 may be coupled to the stop flange 124 and may extend through an anti-vibration sleeve 126, with the anti-vibration sleeve positioned between the stop flange 124 and the sensor 112 and against a bottom of the stop flange 124. In general, the anti-vibration sleeve 126 may be configured to provide stability against mechanical vibration in the temperature sensor system 110, and may be added on to the system 110 after the cable 114 is coupled to the stop flange 124. Installation of the cable 114 into the exhaust system may secure the anti-vibration sleeve 126 to the system 110. For example, the mechanical interface between the exhaust system and the system 110 may be configured to receive the anti-vibration sleeve 126 in manner which secures the sleeve to the bottom of the stop flange 124.

Figure 6:
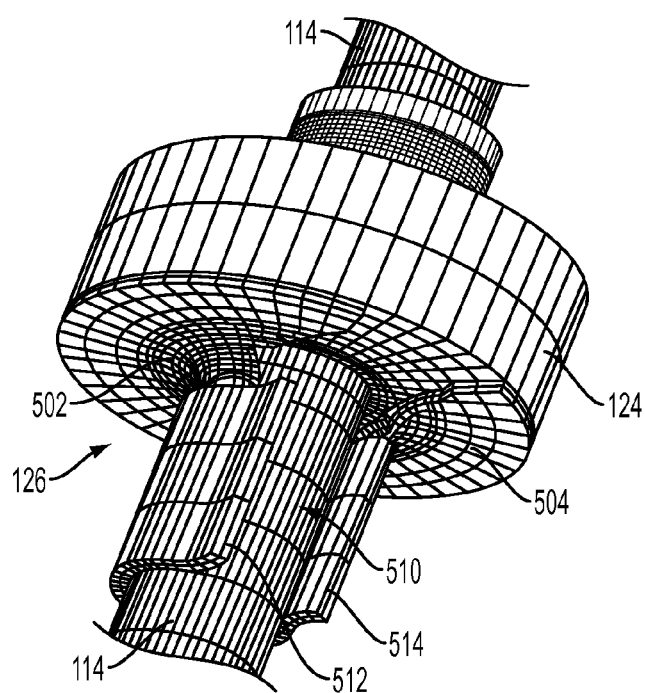
FIG. 6 is a perspective view of a portion of a sensor system consistent with the present disclosure.
Figure 7:
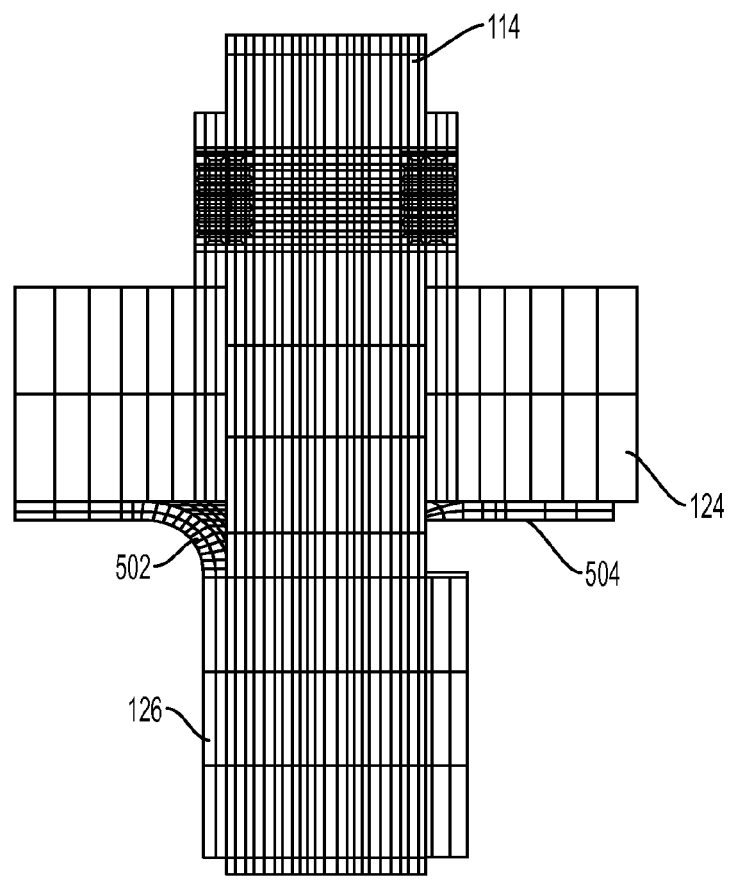
FIG. 7 is a sectional view of the portion of the sensor system shown in FIG. 6.

As shown in FIGS. 5-7, the anti-vibration sleeve 126 may include a through passage 506 for the cable 114 and an open side 510 for receiving the cable 114. In the illustrated exemplary embodiment, the sleeve 126 includes a body portion 500, a transition portion 502, and an upper flange portion 504. The body portion 500 and may be generally cylindrical and may include first 512 and second 514 outwardly arcing tabs extend outwardly from the body portion 500 at opposed edges of the open side 510 of the sleeve. The outside surface of the transition portion 502 may arc outwardly from the outside surface of the tubular portion of the body portion 500 to a bottom surface of the flange portion 504. The transition portion 502 and flange portion 504 may be generally annular having an open side intersecting the through passage 506 and aligned to at least partially define the open side 510 in the sleeve.

In general, the open side 510 in the anti-vibration sleeve allows the sleeve to be assembled to the system 110 after the cable 114 is coupled to the stop flange 124. The open side 510 of the sleeve may be placed adjacent the cable 114 with the flange portion 504 of the sleeve disposed adjacent the bottom of the stop flange. The tabs 512, 514 allow the sleeve to be press fit onto the cable 114 by expanding outwardly to accept the cable in the through passage 506 of the sleeve and the contracting inwardly to close the sleeve around the cable 114. When the nut 122 is coupled to the exhaust system, the flange portion 504 of the sleeve is forced against the bottom of the stop flange and the body of the sleeve is forced against the cable 114 to secure the sleeve to the system 110.

Figure 8:
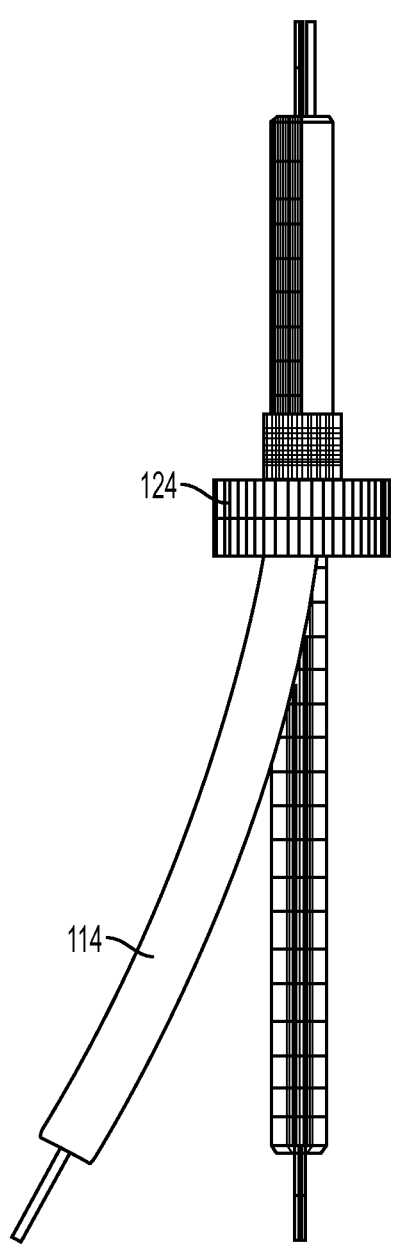
FIG. 8 diagrammatically illustrates vibrational performance of a sensor system not including an anti-vibration sleeve.
Figure 9:
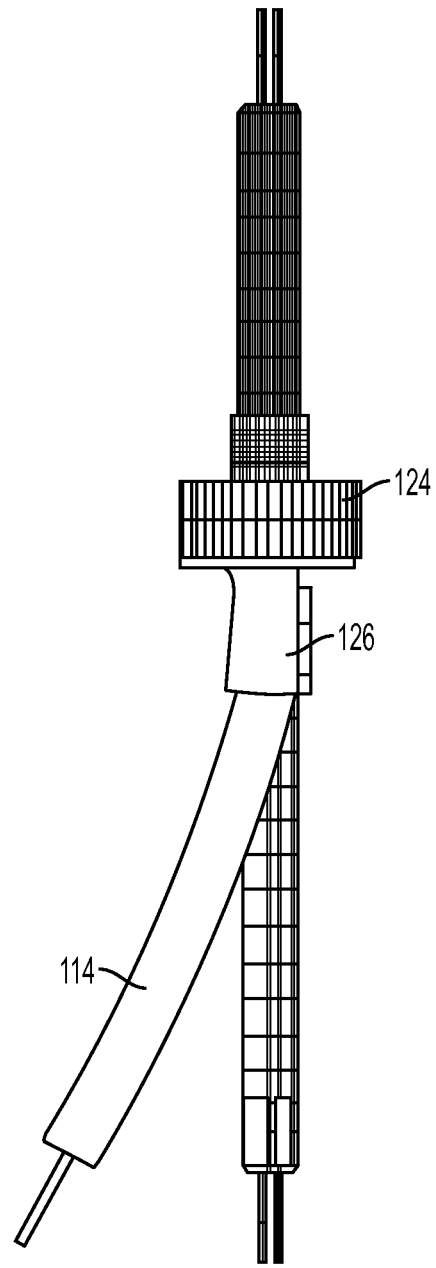
FIG. 9 diagrammatically illustrates vibration performance of a sensor system consistent with the present disclosure including an anti-vibration sleeve.

Advantageously, an anti-vibration sleeve consistent with the present disclosure reduces vibrational stresses on the sensor system providing longer system life. For example, FIG. 8 illustrates the results of a vibration test for a temperature sensor system that does not include an anti-vibration sleeve consistent with the present disclosure, and FIG. 9 illustrates the results of the vibration test for a temperature sensor system 110 including an anti-vibration sleeve consistent with the present disclosure. As diagrammatically illustrated in FIGS. 8 and 9, a system including an anti-vibration sleeve consistent with the present disclosure is more vibrationally stable than a system without an anti-vibration sleeve, i.e. it deflects less in the illustrated x and y directions, when vibrated at the same or higher frequencies.

Figure 10:
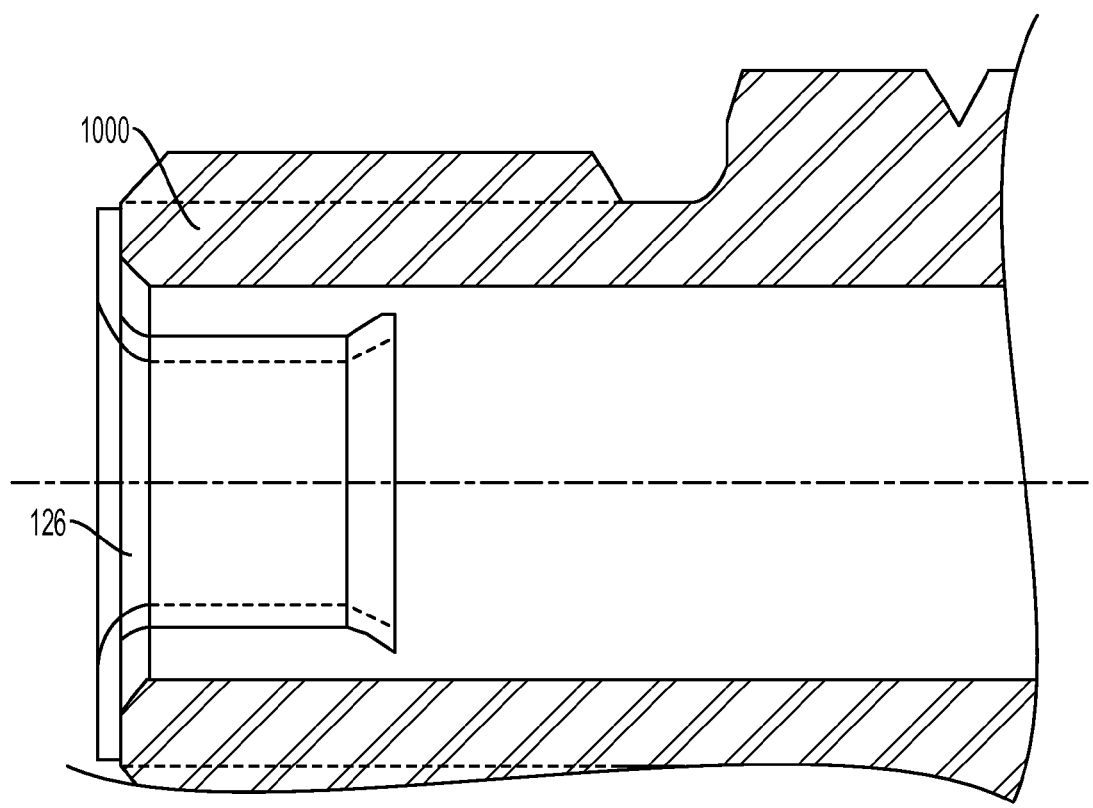
FIG. 10 is a sectional view of a stop flange including another embodiment of an anti-vibration sleeve on an interior thereof, consistent with the present disclosure.

FIG. 10 illustrates another exemplary embodiment of an anti-vibration sleeve consistent with the present disclosure. The illustrated sleeve is similar to the sleeve 126, but is configured to fit inside an associated stop flange 1000 or nut.

According to one aspect of the disclosure there is thus provided a temperature sensor system including: a temperature sensor; a cable having an end coupled to the temperature sensor; a stop flange coupled to the cable; and an anti-vibration sleeve positioned against a bottom surface of the stop flange and between the stop flange and the temperature sensor. The anti-vibration sleeve may include a body portion defining a through passage and an open side portion, the through passage and open side portion being configured to receive at least a portion of the cable.

According to another aspect of the disclosure there is provided a system including: an engine; an exhaust system configured to carry exhaust gases from the engine; a temperature sensor system coupled to the exhaust system for detecting a temperature of the exhaust gases; and a vehicle control system configured to control at least one operating parameter of the engine in response to an output of the temperature sensor. The temperature sensor system may includes a temperature sensor; a cable having an end coupled to the temperature sensor; a stop flange coupled to the cable; and an anti-vibration sleeve positioned against a bottom surface of the stop flange and between the stop flange and the temperature sensor. The anti-vibration sleeve may include a body portion defining a through passage and an open side portion, the through passage and open side portion being configured to receive at least a portion of the cable.

According to another aspect of the disclosure there is provided a temperature sensor including: a housing; a temperature sensing element disposed in the housing; electrical connections extending from the temperature sensing element through the housing; and an epoxy disposed in the housing and at least partially around the temperature sensing element. The epoxy provides a thermal pathway between the sensing element and the housing and being flexible to accommodate different rates of thermal expansion between the temperature sensing element and the electrical connections without requiring a separate mechanical strain relief.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A temperature sensor system comprising:
   a temperature sensor;
   a cable comprising at least one electrical conductor having an end coupled to said temperature sensor, said cable further comprising an insulator surrounding at least a portion of said at least one electrical conductor;
   a stop flange coupled to and abutting against an outside surface of said cable, said stop flange defining an internal passageway; and
   an anti-vibration sleeve positioned against said stop flange after said stop flange is coupled to said outside surface of said cable, said anti-vibration sleeve comprising a body portion defining a through passage and further including opposing, generally longitudinal edges extending along a length of said anti-vibration sleeve and defining a generally longitudinal opening extending along said length of said anti-vibration sleeve configured to receive at least a portion of said cable into said through passage, said anti-vibration sleeve further comprising a transition portion extending from said body portion and a flange portion extending from said transition portion and configured to engage against said stop flange;
   wherein insulator and said at least one electrical conductor of said cable are configured to extend through said internal passageway of said stop flange and said through passage of said anti-vibration sleeve.

2. The temperature sensor system of claim 1 wherein each of said opposing, generally longitudinal edges having at least a portion configured to expand outwardly and receive at least a portion of said cable.

3. The temperature sensor system of claim 2 wherein said at least a portion of each of said opposing, generally longitudinal edges is configured to contract inwardly and retain said cable within said through passage.

4. The temperature sensor system of claim 1 wherein said anti-vibration sleeve is configured to provide stability and reduce vibrational stress to said temperature sensor system.

5. The temperature sensor system of claim 1 wherein said temperature sensor comprises:
   a housing;
   a temperature sensing element disposed in said housing; and
   electrical connections extending from said temperature sensing element through said housing.

6. The temperature sensor system of claim 5 wherein said temperature sensing element comprises a resistive temperature detector comprising a metal film disposed on at least one substrate.

7. The temperature sensor system of claim 5 further comprising a body portion, said housing being coupled to said body portion and configured to seal said temperature sensing element therein.

8. The temperature sensor system of claim 1 wherein said temperature sensor comprises a resistive temperature detector.

9. The temperature sensor system of claim 1, wherein said flange portion of said anti-vibration sleeve engages a bottom surface of said stop flange and is positioned between said stop flange and a mounting nut coupled to said cable and capable of freely traversing along a length of said cable.

10. The temperature sensor system of claim 1 wherein said cable comprises a mineral insulated cable.

11. The temperature sensor system of claim 10 wherein said mineral insulated cable comprises an outer sheathing substantially covering said insulator and including said outer surface.

12. A system comprising:
an engine;
an exhaust system configured to carry exhaust gases from said engine;
a temperature sensor system coupled to said exhaust system for detecting a temperature of said exhaust gases, said temperature sensor system comprising:
a temperature sensor;
a cable comprising at least one electrical conductor having an end coupled to said temperature sensor, said cable further comprising an insulator surrounding at least a portion of said at least one electrical conductor; and
a stop flange coupled to and abutting against an outside surface of said cable, said stop flange defining an internal passageway;
an anti-vibration sleeve positioned against said stop flange after said stop flange is coupled to said outside surface of said cable, said anti-vibration sleeve comprising a body portion defining a through passage further including opposing, generally longitudinal edges extending along a length of said anti-vibration sleeve and defining a generally longitudinal opening extending along said length of said anti-vibration sleeve configured to receive at least a portion of said cable into said through passage, said anti-vibration sleeve further comprising a transition portion extending from said body portion and a flange portion extending from said transition portion and configured to engage against said stop flange; and
a vehicle control system configured to control at least one operating parameter of said engine in response to an output of said temperature sensor;
wherein insulator and said at least one electrical conductor of said cable are configured to extend through said internal passageway of said stop flange and said through passage of said anti-vibration sleeve.

13. The system of claim 12 wherein each of said opposing, generally longitudinal edges having at least a portion configured to expand outwardly and receive at least a portion of said cable.

14. The system of claim 13 wherein said at least a portion of each of said opposing, generally longitudinal edges is configured to contract inwardly and retain said cable within said through passage.

15. The system of claim 12 wherein said anti-vibration sleeve is configured to provide stability and reduce vibrational stress to said temperature sensor system.

16. The system of claim 12 wherein said temperature sensor comprises:
a housing;
a temperature sensing element disposed in said housing; and
electrical connections extending from said temperature sensing element through said housing.

17. The system of claim 16 wherein said temperature sensing element comprises a resistive temperature detector comprising a metal film disposed on at least one substrate.

18. The system of claim 12 wherein said temperature sensor system further comprises a mounting nut coupled to said cable and capable of freely traversing along a length of said cable, wherein said flange portion of said anti-vibration sleeve engages a bottom surface of said stop flange and is positioned between said stop flange and said mounting nut.

19. The system of claim 12 wherein said cable comprises a mineral insulated cable.

20. The system of claim 19 wherein said mineral insulated cable comprises an outer sheathing substantially covering said insulator and including said outer surface.

* * * * *